United States Patent
Birka et al.

(10) Patent No.: US 8,402,223 B2
(45) Date of Patent: Mar. 19, 2013

(54) CACHE EVICTION USING MEMORY ENTRY VALUE

(75) Inventors: Adrian Birka, Redmond, WA (US);
Adam Prout, Kirkland, WA (US);
Sangeetha Shekar, Redmond, WA (US);
Georgiy I. Reynya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 13/053,171

(22) Filed: Mar. 21, 2011

(65) Prior Publication Data

US 2012/0246411 A1    Sep. 27, 2012

(51) Int. Cl.
*G06F 12/00*    (2006.01)
(52) U.S. Cl. ......... 711/133; 711/E12.037; 711/E12.041; 711/E12.07; 711/E12.076
(58) Field of Classification Search ................... 711/133
See application file for complete search history.

(56) References Cited

U.S. PATENT DOCUMENTS

| | | | |
|---|---|---|---|
| 7,047,387 B2 | 5/2006 | Goodsell | |
| 7,360,042 B2 * | 4/2008 | Chen et al. | 711/159 |
| 7,502,889 B2 * | 3/2009 | Sistla | 711/133 |
| 7,568,072 B2 * | 7/2009 | Begon et al. | 711/133 |
| 7,590,803 B2 | 9/2009 | Wintergerst | |
| 7,917,694 B1 * | 3/2011 | Venkatachary | 711/113 |
| 8,131,931 B1 * | 3/2012 | Roberts et al. | 711/118 |
| 2006/0010173 A1 * | 1/2006 | Kilday et al. | 707/200 |
| 2010/0318747 A1 | 12/2010 | Abts et al. | |

OTHER PUBLICATIONS

Jim Handy, "The Cache Memory Book: The Authoritative Reference on Cache Design", Second Edition, 1998, pp. 56-63 and 210-211.*
Plan Cache Internals, Jan. 3, 2011 (Retrieved Date), (1 page).
Tuning guide for dynamic cache and data replication service, Jan. 3, 2011 (Retrieved Date), (6 pages).
Eviction, Jan. 3, 2011 (Retrieved Date), (2 pages).
Storage and Backing Map, Jan. 3, 2011 (Retrieved Date), (5 pages).
Cache Eviction Algorithms, Jan. 3, 2011 (Retrieved Date), (2 pages).

* cited by examiner

*Primary Examiner* — Edward Dudek, Jr.
*Assistant Examiner* — Christopher Birkhimer
(74) *Attorney, Agent, or Firm* — Workman Nydegger

(57) ABSTRACT

Embodiments are directed to efficiently determining which cache entries are to be evicted from memory and to incorporating a probability of reuse estimation in a cache entry eviction determination. A computer system with multiple different caches accesses a cache entry. The computer system determines an entry cost value for the accessed cache entry. The entry cost value indicates an amount of time the computer system is slowed down by to load the cache entry into cache memory. The computer system determines an opportunity cost value for the computing system caches. The opportunity cost value indicates an amount of time by which the computer system is slowed down while performing other operations that could have used the cache entry's cache memory space. Upon determining that the entry cost value is lower than the opportunity cost value, the computer system probabilistically evicts the cache entry from cache memory.

20 Claims, 3 Drawing Sheets

CACHE EVICTION USING MEMORY ENTRY VALUE

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to interact with other software applications or other computer systems. For example, a client may interact with a server or database using a software application. The database may be configured to supply data to the user in response to the user's requests. The database may keep certain portions of the data in caches, while the other data resides on disk. The data portions in the caches change over time as different portions of data are accessed. Eviction algorithms are used by the database to continually clean out the cache. These eviction algorithms, however, are not always efficient.

BRIEF SUMMARY

Embodiments described herein are directed to efficiently determining which cache entries are to be evicted from memory and to incorporating a probability of reuse estimation in a cache entry eviction determination. In one embodiment, a computer system with multiple different caches accesses a cache entry. The computer system determines an entry cost value for the accessed cache entry. The entry cost value indicates an amount of time the computer system is slowed down by to create the cache entry in cache memory. The computer system determines an opportunity cost value for the computing system caches. The opportunity cost value indicates an amount of time by which the computer system is slowed down while performing other operations that could have used the cache entry's cache memory space. The computer system may implement a comparison of the entry cost value to the opportunity cost value to determine whether the cache entry is to be evicted. If the entry is to be evicted, the computer system will evict the cache entry from cache memory; if the entry is not to be evicted, it will remain in cache memory.

In another embodiment, a computer system with multiple different caches accesses a cache entry. The computer system determines an entry cost value for the accessed cache entry. The entry cost value indicates an amount of time the computer system is slowed down by to create the cache entry in cache memory. The computer system determines an opportunity cost value for the computing system caches. The opportunity cost value indicates an amount of time by which the computer system is slowed down while performing other operations that could have used the cache entry's cache memory space. The computer system determines for each cache entry, the probability that the cache entry will be re-used within a specified time. Upon determining that the probability that the cache entry will be re-used within a specified time, multiplied by the entry cost value, is lower than the opportunity cost value, the computer system will probabilistically evict the cache entry from cache memory.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
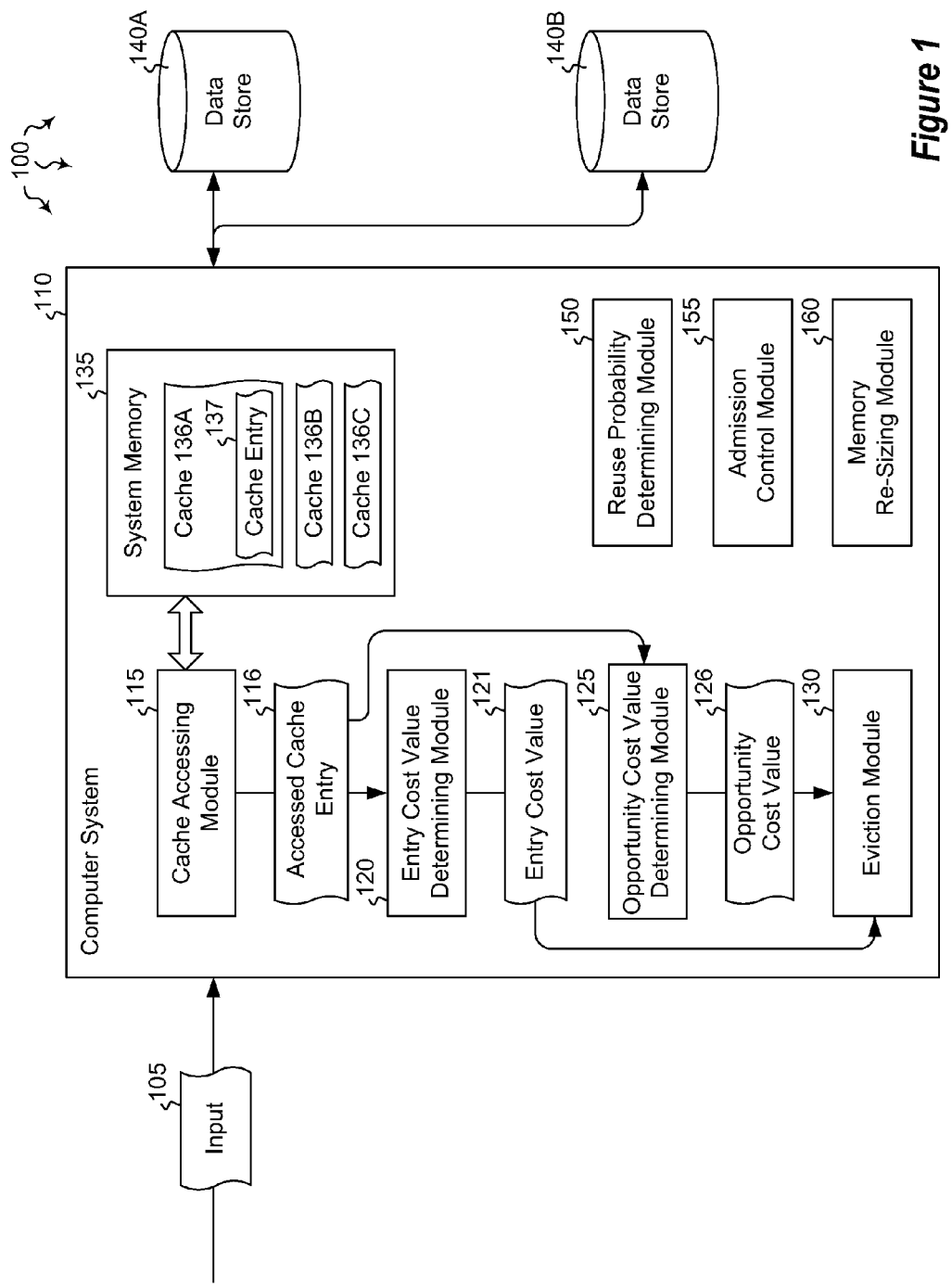
FIG. 1 illustrates a computer architecture in which embodiments of the present invention may operate including efficiently determining which cache entries are to be evicted from memory and incorporating a probability of reuse estimation in a cache entry eviction determination.

Embodiments described herein are directed to efficiently determining which cache entries are to be evicted from memory and to incorporating a probability of reuse estimation in a cache entry eviction determination. In one embodiment, a computer system with multiple different caches accesses a cache entry. The computer system determines an entry cost value for the accessed cache entry. The entry cost value indicates an amount of time the computer system is slowed down by to create the cache entry in cache memory. The computer system determines an opportunity cost value for the computing system caches. The opportunity cost value indicates an amount of time by which the computer system is slowed down while performing other operations that could have used the cache entry's cache memory space. The computer system may implement a comparison of the entry cost value to the opportunity cost value to determine whether the cache entry is to be evicted. If the entry is to be evicted, the computer system will evict the cache entry from cache memory; if the entry is not to be evicted, it will remain in cache memory.

In another embodiment, a computer system with multiple different caches accesses a cache entry. The computer system determines an entry cost value for the accessed cache entry. The entry cost value indicates an amount of time the computer system is slowed down by to create the cache entry in cache memory. The computer system determines an opportunity cost value for the computing system caches. The opportunity cost value indicates an amount of time by which the computer system is slowed down while performing other operations that could have used the cache entry's cache memory space. The computer system determines, for each cache entry, the probability that the cache entry will be re-used within a specified time. Upon determining that the probability that the cache entry will be re-used within a specified time, multiplied by the entry cost value, is lower than the opportunity cost value, the computer system will probabilistically evict the cache entry from cache memory.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 110. Computer system 110 may be any type of local or distributed computing system, including a cloud computing system. The computer system may be configured to interact with other users (e.g. via input 105) and other computer systems (e.g. data stores 140A and 140B). The computer system may include various modules which perform different functions. For example, the cache accessing module 115 may access cache entries (e.g. 137) from various different caches (136A, 136B and 136C) in system memory 135. The cache entry accessed by module 115 (i.e. accessed cache entry 116) may be sent to either or both of modules 120 and 125.

Entry cost value determining module 120 may be configured to determine the entry cost value for the accessed cache entry. In many cases, cache entries may be competing for storage in the various caches. An eviction algorithm may be used to determine which cache entries are to be kept and which are to be evicted. As used herein, the term "entry cost value" may refer to an amount of time the computer system is slowed down by to create the cache entry in cache memory. Some cache entries may take a longer or shorter amount of time to be loaded into cache memory. This determined entry cost value 121 may be sent to eviction module 130, which is, in turn, configured to decide whether to evict the cache entry or allow it to stay in the cache.

The eviction module may use multiple factors in its decision whether to evict a particular entry. Aside from the entry cost value, the eviction module may also consider opportunity cost value 126, as generated by opportunity cost value determining module 125. The term "opportunity cost value", as used herein, may refer to an amount of time by which the computer system 110 is slowed down while performing other operations that could have used the cache entry's cache memory space. Thus, for example, by evicting the accessed cache entry 116, the computer system would have had more memory to process other tasks. The opportunity cost measures the amount the computer is slowed down by not having that cache entry's memory space available in memory.

The eviction module 130 may also use other factors in its eviction determination, including a probability of reuse. For instance, reuse probability determining module 150 may determine what the probability is that the accessed cache entry will be reused again within a specified timeframe. Various statistics about the prior use of cache entries may be used in the determination. If there is a high likelihood that the cache entry will be reused again in the near future, the eviction module will be less likely to evict it. The reverse is also true: if there is a low likelihood that the cache entry will be reused again in the near future, the eviction module will be more likely to evict it. In addition to probability, frequency of usage may be accounted for by dividing the entry cost by the average time between uses. In this manner, the more frequently used entries are likely to stay in the cache longer.

Admission control module 155 may use any one or more of the entry cost value, the opportunity cost value, or the reuse probability to determine whether to allow cache storage of an entry in the first place. Thus, the admission control module may filter the cache entries before storage, such that only the most valuable (e.g. the most highly used) pages are stored in cache. Based on which entries are determined to be valuable, memory re-sizing module 160 may re-size the various caches (136A-C) according to where the memory will be best used.

In some embodiments, a database memory controller may be built into the cache eviction algorithm itself. Given the value of a particular cache entry and the value of memory to other caches in the system, the eviction algorithm can determine which entries should be evicted so only the most valuable entries to the system remain in memory.

In some cases, a simulation may be performed to determine whether a cache should receive memory. The simulation may simulate what would happen if the cache had a certain percentage (e.g. 10%) more memory. The lookup keys for the most recently evicted entries from the cache are stored. Then, the simulation tracks how often this set of entries is accessed during the simulation. The simulation further tracks how much system-time-saved the system would have gained if the entries in the simulated cache were actually in memory. In this manner, the advantage of having the extra percentage of memory can be calculated for each cache in the system.

In one embodiment, a cache eviction algorithm may periodically sweep the cache entries in the cache. Determinations as to which cache entries are to be evicted may be made based on various equations. For example, P may be the probability that a cache entry will be used again in the future [no units], µ may represent the average time between uses of an entry, based on previous execution history [in milliseconds (ms)]. C may represent the cost of building the entry in system-time saved as described above [ms/page] (i.e., entry cost value 121). O may be the Opportunity cost (i.e. opportunity cost 126) in milliseconds per page to hold a page in the cache [ms/page] (i.e., by caching this page, the server is slowed down by O while doing other operations that could have used this memory instead). O may be calculated by taking the average benefit of extra memory for each cache determined by the simulations described above. W may be the period of time between sweeps [ms], and p may be the pole of the system. The pole may be a number between 0 and 1 that controls various properties of the system (how quickly it converges and how much oscillation occurs before convergence).

Then, during a sweep of the cache, pages should be evicted with a probability p if:

$$\frac{PC}{\mu} < \frac{O}{W}.$$

That is, if the expected cost of evicting an entry (PC) normalized by the average time between executions $$\left(\frac{PC}{\mu}\right)$$

is less than the opportunity cost of holding a page in the cache until the next sweep $$\left(\frac{O}{W}\right),$$

then the entry should be evicted p % of the time. The system may normalize by the average time between executions to make entries accessed more often more valuable in the model than those executed less often. The system also makes the units on both sides comparable $$\left(\frac{ms}{page \, ms}\right).$$

In some cases, $$\frac{PC}{\mu}$$

may refer to the cost to evict the plan from the cache, expressed as percent slowdown per page of memory freed that the system will suffer (on average, since the formula is probabilistic). This is referred to herein as "Value-of-memory" costing. Furthermore, $$\frac{O}{W}$$

may refer to the opportunity cost to other components of the system. It is the percent speedup per page of memory freed that the system will have because this memory was released to the rest of the system. Comparing each entry to the value of memory determines whether to evict the entry.

The variable P (the probability an entry will be re-used in the future) may be calculated by tracking past usage statistics and assuming each entry's usage is exponentially distributed. Using P in the cost calculation of the eviction algorithm factors in the probability of re-use, thus naturally decaying an entry's cost over time if the entry isn't re-used.

In some embodiments, the same check to determine if an entry should be evicted, can be performed when a new entry arrives at the cache, to determine if it should be cached in the first place. This may be referred to herein as "admission control". For admission control, one or more different techniques may be used to estimate P, since past usage history will not be available.

The costing information $$\left(\frac{PC}{\mu}\right)$$

may be used for each entry in any cache. A cost curve can be built that relates cost to the size the caches will shrink to if all entries with a lower cost are evicted. Using this cost curve, a cut-off can be calculated that will shrink the memory used by caches to a specific size by evicting the least valuable entries in the caches. This allows the system to shrink its total memory use. Thus, a control algorithm may be run that sizes the caches with the best interest of the system as a whole in mind. For instance, local cache eviction decisions may be made such that the system as a whole maximizes its use of memory. Moreover, local cache evictions may maximize the use of their own memory, These concepts will be explained further below with regard to methods 200 and 300 of FIGS. 2 and 3, respectively.

Figure 2:
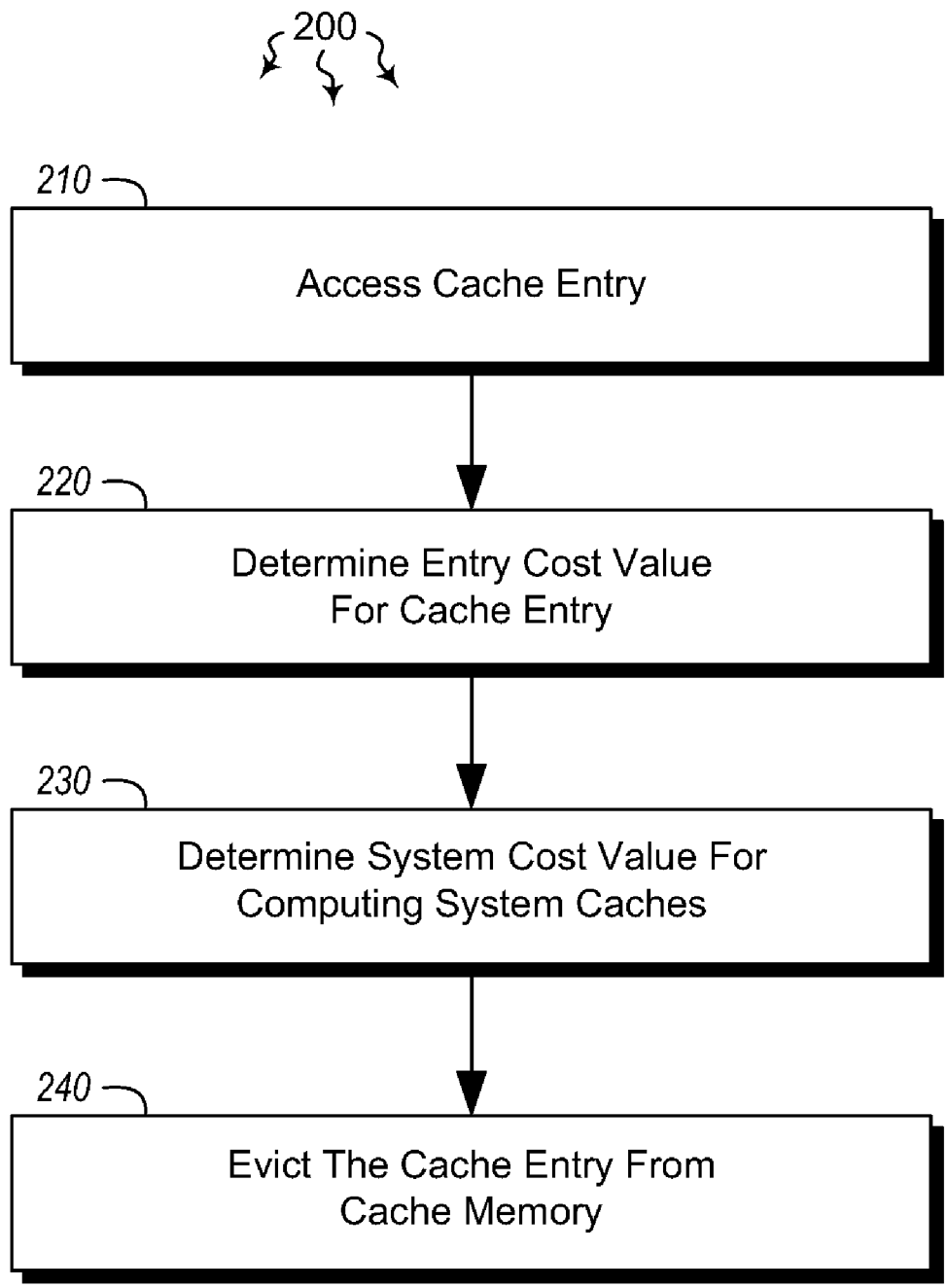
FIG. 2 illustrates a flowchart of an example method for efficiently determining which cache entries are to be evicted from memory.
Figure 3:
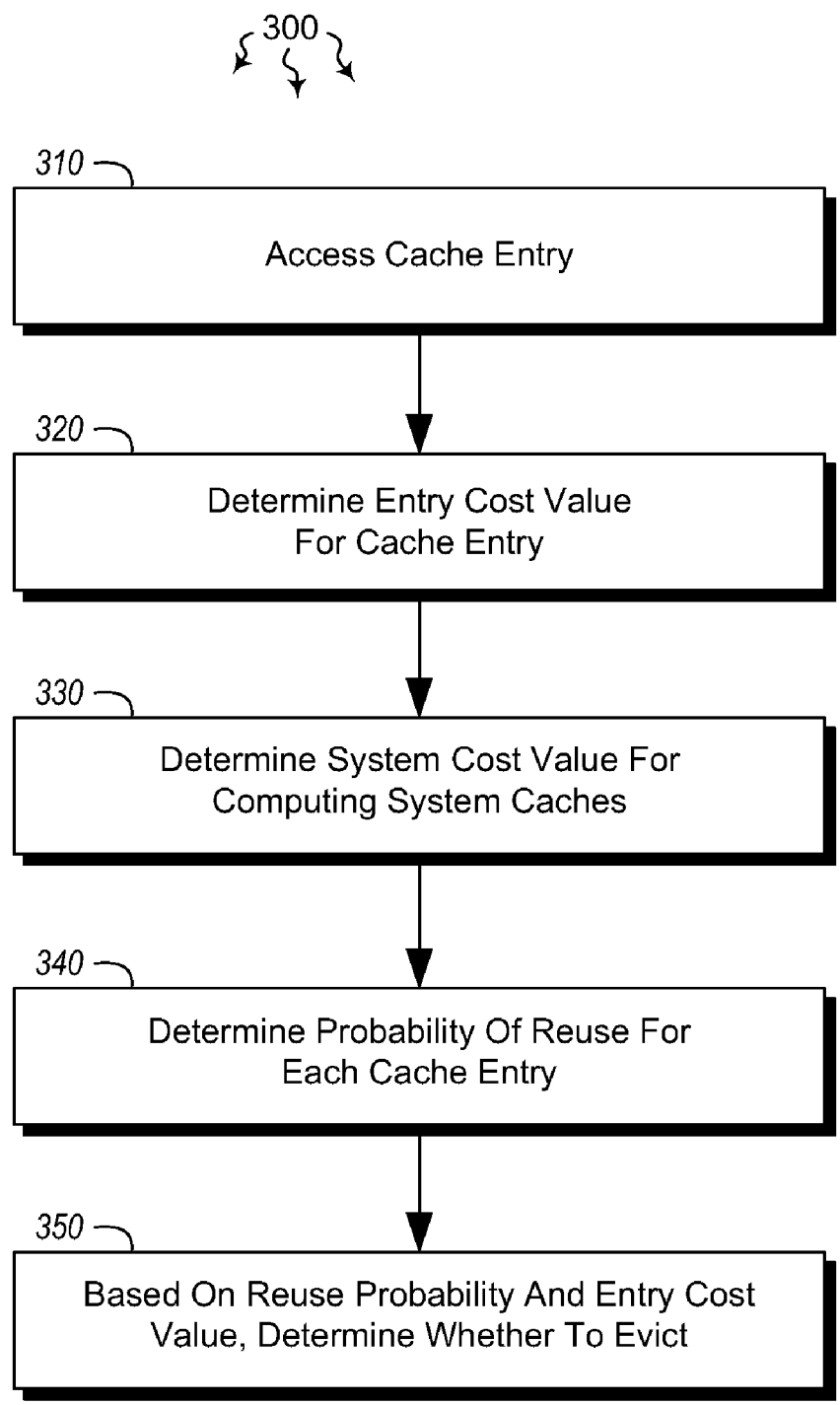
FIG. 3 illustrates a flowchart of an example method for incorporating a probability of reuse estimation in a cache entry eviction determination.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for efficiently determining which cache entries are to be evicted from memory. The method 200 will now be described with frequent reference to the components and data of environment 100.

Method 200 includes an act of accessing a cache entry, wherein the cache entry is one of a plurality of cache entries in a computing system that comprises multiple different caches (act 210). For example, cache accessing module 115 may access cache entry 137 in cache 136A. The system memory 135 may have many different caches (including 136B and 136C), as well as other caches not shown in FIG. 1.

In some cases, computer system 110 may be a database server. In such cases, the cache entries may be compiled stored procedures or query plans. Each entry (or database plan) may be individually and continually examined to determine whether the cache entry is to be evicted. In some instances, the cache entries may be evaluated periodically at a set rate. In other cases, the cache entries may be evaluated based on the occurrence of an event, such as an indication that available or free memory is low. In the evaluation, cache entries from multiple different caches may each be individually and continually examined with respect to other cache entries from other caches to determine whether the cache entry is to be evicted. Thus, regardless of which memory cache the entry is stored in, the eviction algorithm may keep those entries that are the most valuable to the system overall, and evict those that are less valuable.

Method 200 includes an act of determining an entry cost value for the accessed cache entry, wherein the entry cost value indicates an amount of time the computer system is slowed down by to load the cache entry into cache memory (act 220). For example, entry cost value determining module 120 may determine an entry cost value 121 for accessed cache entry 116. As explained above, the entry cost value may be the amount of time the computer system is slowed down by to create the accessed cache entry. In some cases, this may be measured in milliseconds. The entry cost may also use an accumulated time which includes the amount of time the computer system is slowed down by when creating the entry or when multiple threads are waiting for the entry. The cache entry's data may be stored on one or more data stores (e.g. data stores 140A/140B). Transferring the data from the data store (i.e. from a disk or other form of storage) to the system memory takes an amount of time equal to the entry cost value.

Method 200 includes an act of determining an opportunity cost value for the computing system caches, wherein the opportunity cost value indicates an amount of time by which the computer system is slowed down while performing other operations that could have used the cache entry's cache memory space (act 230). For example, opportunity cost value determining module 125 may determine opportunity cost value 126 for computer system 110. It is the amount of time by which the computer system is slowed down while performing other operations that could have used the cache entry's cache memory space. Thus, the cost to the system to keep an entry in cache is the lost ability to use that cache entry's memory space to process a different entry. A simulation may be performed to assist in determining the system value cost.

The simulation may include various steps. The simulation may first determine which cache entries were most recently evicted from the cache and store them (or store links or identity keys to them) in a simulated cache. The simulation may then track how often each of the evicted cache entries is subsequently requested. Lastly, the simulation may determine how much system processing time would have been gained if the entries in the simulated cache were in an actual cache. This amount of time may thus indicate an opportunity cost in time for having a larger cache or keeping entries in a cache.

In some cases, the simulation may simulate what would happen if the computing system cache had an increased amount of memory (e.g. ten percent more memory). Operating processes may be processed using virtual memory (i.e. program-specific virtualized memory space), memory from other caches, memory from another computer system, or other memory that is available to the computer system. This memory may be used to simulate running a computer operation with an increased amount of memory (or, from another perspective, the amount of memory the system would have if it did not keep a certain entry or entries in cache).

The eviction module 130, when determining whether to evict a cache entry, may look at multiple different factors. It may look at the entry cost value 121, the opportunity cost value 126, the probability of reuse and/or a user's current workload. Over a period of time, a computer system user's workload may fluctuate between heavy use, light use and no use. In such cases, eviction module may be updated more or less often to accommodate the user's needs. When the computer system work load has a higher demand for memory, the eviction module may perform eviction sweeps at a higher rate than when the user is only lightly using the computer.

The reuse probability determining module 150 may determine, for each cache entry, the probability that the cache entry will be re-used within a specified time. If the cache entry has been used often in the past (e.g. according to prior use logs and intervals between uses), module 150 may determine that there is a high likelihood that the cache entry will be used again, and thus should be kept in memory. Alternatively, if the cache entry has not been used very often in the past, module 150 may determine that there is a low likelihood that the cache entry will be used again in the near future, and should not be kept in memory. The determined reuse probability may be used, along with the opportunity cost and entry cost values, to determine whether a cache entry is to be evicted.

Method 200 includes an act of comparing the entry cost value to the opportunity cost value to determine whether the cache entry is to be evicted. If the comparison determines that the entry is to be evicted, it is evicted from cache memory (act 240). For example, if the eviction module 130 determines that the entry cost value 121 is lower than the opportunity cost value 126, the cache entry 137 will be evicted from the cache 136A. Thus, if the amount of time the computer system is slowed down by to load the cache entry into cache memory is lower than the amount of time by which the computer system is slowed down while performing other operations that could have used the cache entry's cache memory space, the cache entry is not valuable enough to keep in memory, and will be evicted. The memory can then be used to store other, different cache entries.

In some cases, a cache entry may be evicted according to a probability p, where p is the pole. The pole may be based on indication of how quickly the computer system will converge and/or based on an indication of how much oscillation occurs before the convergence. The entries may then be probabilistically evicted based on the pole value.

In some embodiments, the eviction determination made by the eviction module may be used to provide admission control. Accordingly, admission control module 155 may allow or prevent cache entries from being stored in system cache. Thus, if a cache entry has a cache entry value lower than a threshold value (e.g., the opportunity cost), admission control would prevent the cache entry from being admitted, or stored in cache. In some cases, if the admission control prevents a certain amount of cache entries from being cached, or if system cache is otherwise not needed, the memory re-sizing module 160 may determine that total system memory for the various caches is to be decreased. Then, those cache entries whose entry cost values are below a specified threshold value are evicted.

Turning now to FIG. 3, FIG. 3 illustrates a flowchart of a method 300 for incorporating a probability of reuse estimation in a cache entry eviction determination. The method 300 will now be described with frequent reference to the components and data of environment 100.

Method 300 includes an act of accessing cache entry 137. As above, the cache entry is one of many different cache entries in a computing system that includes multiple different caches (act 310). The entry cost value determining module 120 may determine an entry cost value 121 for the accessed cache entry 116, where the entry cost value is the amount of time the computer system is slowed down by to load the cache entry into cache memory (act 320). The opportunity cost value determining module 125 may determine an opportunity cost value 126 for the computing system cache entries, where the opportunity cost value is the amount of time by which the computer system is slowed down while performing other operations that could have used the cache entry's cache memory space (act 330).

Method 300 further includes an act of determining, for each cache entry, the probability that the cache entry will be re-used within a specified time (act 340). For example, reuse probability determining module 150 may determine, based on prior use logs and intervals between entry uses, how likely it is that a particular cache entry is to be reused within a specified time period. If a cache entry has a high likelihood of reuse with the specified time period, the eviction module 130 will be more likely to keep the entry in memory, and not evict it.

Method 300 includes, upon determining that the probability that the cache entry will be re-used within a specified time, multiplied by the entry cost value, is lower than the opportunity cost value, an act of probabilistically evicting the cache entry from cache memory (act 350). For example, using the reuse probability determined by module 150, as well as the entry cost value and opportunity cost value, the eviction module may make a decision as to which cache entries are to be kept and which are to be evicted. If an entry's probability of reuse is low, and the entry cost value is lower than the opportunity cost value, the entry will be evicted from memory. If an entry's probability of reuse is high, and the entry cost value is higher than the opportunity cost value, the entry will not be evicted from memory. Accordingly, those entries with the highest overall value will be kept, while the other entries will be evicted.

In some cases, an entry's cost value may be automatically lowered over time at a specified rate if the entry has not been used. This may be accomplished by multiplying entry cost by probability as the probability will be decreasing over time without additional accesses to entry. Admission control may prevent some entries from ever being stored in system cache. When the eviction determination is used to provide admission control, cache entries with a cache entry value lower than a threshold value (e.g., the opportunity cost value) are not stored in system cache. Thus, only cache entries with a threshold value are stored. In some cases, if the computer system determines that one or more portions of memory could be used in a more optimal manner, those cache entries whose entry cost values are below a specified threshold value may be evicted to make room for the more valuable entries.

Accordingly, methods, systems and computer program products are provided which efficiently determine which cache entries are to be evicted from memory. Moreover, methods, systems and computer program products are provided which incorporate a probability of reuse estimation in a cache entry eviction determination to determine whether to keep or evict a cache entry.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for efficiently determining which cache entries are to be evicted from memory, the method comprising:
    an act of accessing a cache entry, wherein the cache entry is one of a plurality of cache entries in a computing system that comprises multiple different caches;
    an act of determining an entry cost value for the accessed cache entry, wherein the entry cost value indicates an amount of time the computer system is slowed down by to create the cache entry in cache memory;

an act of determining an opportunity cost value for the computing system caches, wherein the opportunity cost value indicates an amount of time by which the computer system is slowed down while performing other operations that could have used the cache entry's cache memory space;

an act of comparing the entry cost value to the opportunity cost value to determine whether the cache entry is to be evicted; and upon determining that the cache entry is to be evicted, an act of probabilistically evicting the cache entry from cache memory.

2. The method of claim 1, wherein each cache entry is individually and continually examined to determine whether the cache entry is to be evicted.

3. The method of claim 2, wherein the cache entries from a plurality of different caches are each individually and continually examined with respect to other cache entries from other caches to determine whether each cache entry is to be evicted.

4. The method of claim 1, further comprising:
an act of determining that total system memory for the plurality of computer system caches is to be decreased;
an act of determining a pole value based on at least one of the following: an indication of how quickly the computer system will converge and an indication of how much oscillation occurs before the convergence; and
an act of probabilistically evicting those cache entries whose entry cost values are below the opportunity cost value, wherein the probability of evicting is determined by the pole value.

5. The method of claim 1, further comprising:
an act of performing a cache operation simulation to determine the system value cost;
an act of storing an identity key of one or more of the most recently evicted cache entries in a simulated cache;
an act of tracking whether each of the evicted cache entries is subsequently requested within a specified period of time; and
an act of determining how much system processing time would have been gained if the entries in the simulated cache were in an actual cache.

6. The method of claim 5, wherein the simulation simulates what would happen if the computing system cache had an increased amount of memory.

7. The method of claim 5, wherein a computing system user's current workload used when determining if a specified cache entry is to be evicted.

8. The method of claim 5, further comprising:
an act of determining, for each cache entry, the probability that the cache entry will be re-used within a specified time; and
an act of incorporating the determined probability in the determination to evict the cache entry.

9. The method of claim 8, wherein statistics about previous uses are used to determine the probability that the cache entry will be re-used within a specified period of time.

10. The method of claim 8, wherein an entry's probability of reuse value is automatically lowered over time at a specified rate if the cache entry is not used.

11. The method of claim 1, wherein the eviction determination is used to provide admission control, such that cache entries with a cache entry value lower than a threshold value are not stored in system cache.

12. The method of claim 1, wherein the computing system comprises a database server and wherein the cache entries comprise at least one of compiled database plans and database data pages.

13. The method of claim 1, further comprising:
an act of determining that total system memory for the plurality of computer system caches is to be decreased; and
an act of evicting those cache entries whose entry cost values are below a specified threshold value.

14. A computer program product for implementing a method for incorporating a probability of reuse estimation in a cache entry eviction determination, the computer program product comprising a computer-readable storage device having stored thereon computer-executable instructions that, when executed by one or more processors of a computing system, cause the computing system to perform the method, the method comprising:
an act of accessing a cache entry, wherein the cache entry is one of a plurality of cache entries in a computing system that comprises multiple different caches;
an act of determining an entry cost value for the accessed cache entry, wherein the entry cost value indicates an amount of time the computing system is slowed down by to create the cache entry in cache memory;
an act of determining an opportunity cost value for the computing system caches, wherein the opportunity cost value indicates an amount of time by which the computing system is slowed down while performing other operations that could have used the cache entry's cache memory space;
an act of determining, for each cache entry, the probability that the cache entry will be re-used within a specified time; and
upon determining that the probability that the cache entry will be re-used within a specified time, multiplied by the entry cost value, is lower than the opportunity cost value, an act of probabilistically evicting the cache entry from cache memory.

15. The computer program product of claim 14, wherein prior use logs and intervals between uses are used to determine the probability that the cache entry will be re-used within a specified period of time.

16. The computer program product of claim 14, wherein an entry's probability of reuse value is automatically lowered over time at a specified rate if the cache entry is not used.

17. The computer program product of claim 14, wherein the eviction determination is used to provide admission control, such that cache entries with a cache entry value lower than a threshold value are not stored in system cache.

18. The computer program product of claim 14, further comprising:
an act of determining that total system memory for the plurality of computing system caches is to be decreased;
an act of determining a pole value based on at least one of the following: an indication of how quickly the computing system will converge and an indication of how much oscillation occurs before the convergence; and
an act of probabilistically evicting those cache entries whose entry cost values are below the opportunity cost value, wherein the probability of evicting is determined by the pole value.

19. A computer system comprising the following:
one or more processors;
system memory;
one or more computer-readable storage media having stored thereon computer-executable instructions that, when executed by the one or more processors, causes the computer system to perform a method for efficiently determining which cache entries are to be evicted from memory, the method comprising the following:

an act of accessing a cache entry, wherein the cache entry is one of a plurality of cache entries in a computer system that comprises multiple different caches;

an act of determining an entry cost value for the accessed cache entry, wherein the entry cost value indicates an amount of time the computer system is slowed down by to create the cache entry in cache memory;

an act of determining an opportunity cost value for the computer system caches, wherein the opportunity cost value indicates an amount of time by which the computer system is slowed down while performing other operations that could have used the cache entry's cache memory space, and wherein the opportunity cost value determination includes the following:

an act of storing an identity key one or more of the most recently evicted cache entries in a simulated cache;

an act of tracking whether each of the evicted cache entries is subsequently requested within a specified period of time; and an act of determining how much system processing time would have been gained if the entries in the simulated cache were in an actual cache; and upon determining that the entry cost value is lower than the opportunity cost value, an act of probabilistically evicting the cache entry from cache memory.

20. The system of claim 19, wherein a computing system user's current workload used when determining if a specified cache entry is to be evicted.

* * * * *